United States Patent [19]
Auner et al.

[11] Patent Number: 5,965,684
[45] Date of Patent: *Oct. 12, 1999

[54] PHOTOLUMINESCENT POLYDISILACYCLOBUTANES

[75] Inventors: Norbert Auner, Berlin, Germany; Udo C. Pernisz, Midland, Mich.

[73] Assignee: Dow Corning Corporation, Midland, Mich.

[*] Notice: This patent is subject to a terminal disclaimer.

[21] Appl. No.: 08/951,161

[22] Filed: Oct. 15, 1997

Related U.S. Application Data

[63] Continuation-in-part of application No. 08/877,787, Jun. 17, 1997, Pat. No. 5,861,469.

[51] Int. Cl.⁶ .................................................. C08G 77/20
[52] U.S. Cl. ........................... 528/32; 556/431; 526/279; 528/35
[58] Field of Search ........................... 556/431; 526/279; 528/32, 35

[56] References Cited

U.S. PATENT DOCUMENTS

| | | | |
|---|---|---|---|
| 5,068,381 | 11/1991 | Ito et al. | 556/431 |
| 5,777,051 | 7/1998 | Auner et al. | 528/32 |
| 5,861,469 | 1/1999 | Auner et al. | 528/32 |

OTHER PUBLICATIONS

Journal of Organometallic Chemistry, vol. 336, pp. 59–81, (1987).
Z. anorg. allg. Chem., vol. 558, pp. 55–86, (1998).
Z. anorg. allg. Chem., vol. 558, pp. 87–106, (1988).
Journal of Organometallic Chemistry, vol. 363, pp. 7–23, (1989).
Journal of Organometallic Chemistry, vol. 377, pp. 175–195, (1989).
Journal of Organometallic Chemistry, vol. 393, pp. 33–56, (1990).
Angew. Chem. Int. Ed. Engl., vol. 30, No. 9, pp. 1151–1152, (1991).
Journal of the American Chemical Society, vol. 114, pp. 4910–4911, (1992).
Chem. Ber., vol. 126, pp. 575–580, (1993).
Chem. Ber., vol. 126, pp. 2177–2186, (1993).
Organometallics, vol. 12, pp. 4135–4140, (1993).
J. prakt. Chem., vol. 337, pp. 79–92, (1995).
Bull. Soc. Chim. Fr., vol. 132, pp. 599–603, (1995).
Chem. Eur. J., vol. 3, No. 6, pp. 948–957, (Jun. 1997).

*Primary Examiner*—Melvyn I. Marquis
*Attorney, Agent, or Firm*—James L. DeCesare

[57] ABSTRACT

Photoluminescent polydisilacyclobutanes are made by reacting a dialkenyldihalocarbosilane with an organolithium reagent in the presence of a solvent at 0–25 ° C.

4 Claims, No Drawings

PHOTOLUMINESCENT POLYDISILACYCLOBUTANES

CROSS-REFERENCE TO RELATED APPLICATIONS

This application is a continuation-in-part of our prior application U.S. Ser. No. 08/877,787, filed Jun. 17, 1997, titled "Photoluminescent Bicyclic Polydisilacyclobutanes", which application is assigned to the assignee of this present application now U.S. Pat. No. 5,861,469, granted jan. 19, 1999.

BACKGROUND OF THE INVENTION

This invention is directed to polycarbosilanes, and to polymers in which silicon atoms are linked through substituted alkylene bridges. The substituted polysilalkylenes are polydisilacyclobutanes with two different silacyclobutane units.

The literature makes reference to processes using halosilanes containing a single unsaturated linkage. See for example, *Z. Anorg. Allg. Chem.*, Volume 558, pages 55–86, (1988); *Chem. Ber.*, Volume 126, pages 575–580, (1993); and *J. Prakt. Chem.*, Volume 337, pages 79–92, (1995).

By using halosilanes containing two unsaturated linkages, as exemplified in *Journal of Organometallic Chemistry*, Volume 377, pages 175–195, (1989), we are enabled to produce higher molecular weight materials, i.e., polymers.

While one co-inventor herein has co-authored a recent article relative to certain silacyclobutanes, the article does not describe polymers which replicate the polymer described herein. In particular, reference may be had to *Chem. Eur. J.*, Volume 3, Issue 6, "Towards 2-Silaallenes: Synthesis of Spirocyclic Precursors", pages 948–957, (Jun. 4, 1997).

BRIEF SUMMARY OF THE INVENTION

This invention relates to methods of making photoluminescent polydisilacyclobutanes, and to polydisilacyclobutanes

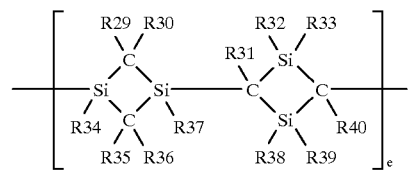

where e and R29 to R40 are defined below.

The polydisilacyclobutanes are made by reacting an organolithium reagent with monomer

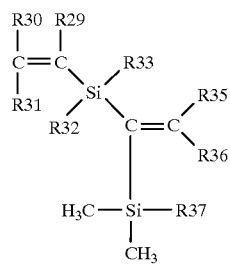

where R29 to R33, and R35–R37 are defined below. Such monomers can be made by methods generally described in *Chem. Ber.*, Volume 126, pages 575–580, (1993).

These and other features of our invention will become apparent from a consideration of the detailed description.

DETAILED DESCRIPTION OF THE INVENTION

This invention is directed to methods of preparing polymers having low to medium degrees of polymerization based on a disilacyclobutane building block. The basic reaction involves using a divinyldichlorocarbosilane and tert-butyllithium in order to obtain desired products.

Unexpectedly, we found that these polymers exhibit strong photoluminescence in the blue region of the visible spectrum when excited by ultraviolet (UV) light with a wavelength of 337 nm (nanometer).

Polymers representative of our invention are polydisilacyclobutanes with repeating unit

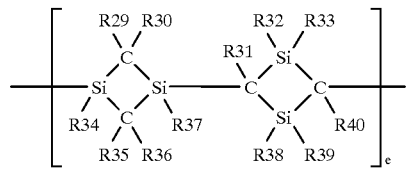

where e has a value of 2 to 20; R32, R33, R38, and R39 are alkyl or aryl groups; R34 and R37 are alkoxy groups; and R29 to R31, R35, R36, and R40 are hydrogen or an alkyl group containing 2 to 10 carbon atoms. These are linear polymers terminated by suitable alkyl, aryl, silyl, halogen, or alkoxy groups.

One species (I) of this genus is:

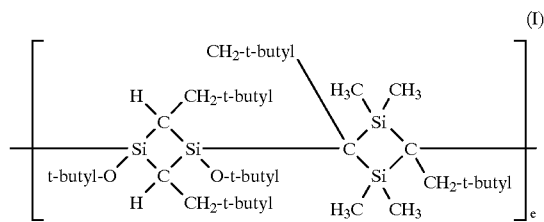

Particles of species (I) where e =10 were irradiated with UV light at a wavelength of 337 nm generated by a pulsed nitrogen laser with 0.1 mJ per pulse. Photoluminescence was bright whiteish blue.

The process for making such polymers is shown below:

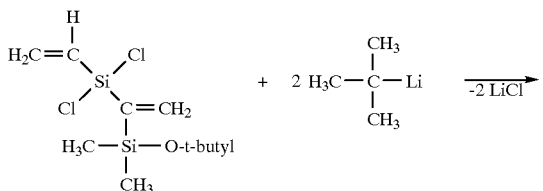

-continued

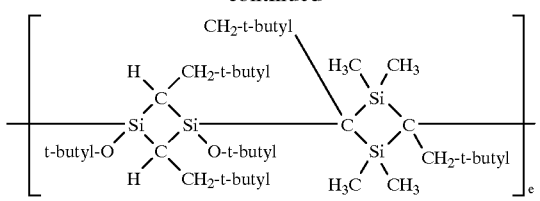

tert-butyllithium is shown as the preferred organolithium reagent. An example representing this process is set forth below illustrating our invention in more detail.

EXAMPLE

Into a container were combined stoichiometric amounts of the unsaturated carbosilane

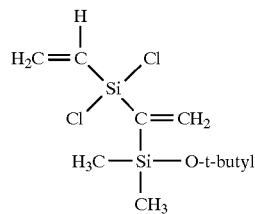

and tert-butyllithium, in pentane as solvent, at 0° C. These reactants were heated to room temperature, i.e., 20–25° C. After removing the solvent, a yellow solid resulted. The yellow solid was identified as species (I) shown above, where e had a value of 10. For purification, a portion of the sample of species (I) was extracted with methanol. As a result, terminal chlorine groups and t-butoxy groups in species (I) were replaced by methoxy groups, yielding a white powder where e also had a value of 10.

Isolation of photoluminescent polydisilacyclobutanes can be carried out by extraction or precipitation by addition of alcohol.

Polymers prepared according to our invention are useful as passive or active display materials, and in electroluminescent devices. In such utility, they can be incorporated into road signs and lane markers. The polymers also find application in various types of displays as luminescent coatings for improving their visibility.

Other variations may be made in polymers, compounds, compositions, and methods described herein without departing from the essential features of our invention. The forms of invention are exemplary only and not intended as limitations on their scope as defined in the appended claims.

We claim:

1. A photoluminescent polydisilacyclobutane with a repeating unit of the formula

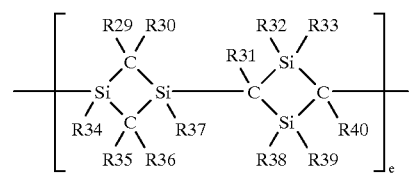

where e is an integer having a value of 2 to 20; R32, R33, R38, and R39 are alkyl or aryl groups; R34 and R37 are alkoxy groups; and R29 to R31, R35, R36, and R40 represent hydrogen or an alkyl group containing 2 to 10 carbon atoms.

2. Photoluminescent polydisilacyclobutanes according to claim 1 exhibiting photoluminescence in the blue region of the visible spectrum when excited by ultraviolet light.

3. A carbosilane of formula

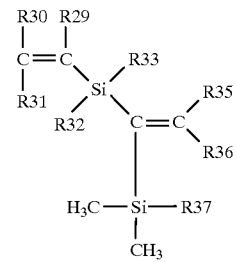

where R29 is hydrogen or an alkyl group containing 2 to 10 carbon atoms; R30, R31, R35, and R36 are hydrogen; R32 and R33 are halogen; and R37 is an alkoxy group.

4. A method of making photoluminescent polydisilacyclobutanes comprising contacting an unsaturated carbosilane containing at least two silicon atoms, with tert-butyllithium in a solvent at a temperature of 0–25° C., the unsaturated carbosilane having the formula

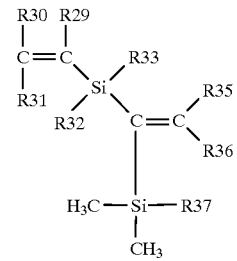

where R29 is hydrogen or an alkyl group containing 2 to 10 carbon atoms; R30, R31, R35, and R36 are hydrogen; R32 and R33 are halogen; and R37 is an alkoxy group.

* * * * *